United States Patent
Nasser

(10) Patent No.: US 12,410,306 B2
(45) Date of Patent: Sep. 9, 2025

(54) PLASTIC MODIFIER COMPRISING NATURAL RUBBER, PLASTIC ARTICLE AND ITS USE

(71) Applicant: PROQUITEC INDÚSTRIA DE PRODUTOS QUÍMICOS S/A, Vargem Grande Paulista (JP)

(72) Inventor: Sidnei Winston Nasser, Vargem Grande Paulista (BR)

(73) Assignee: PROQUITEC INDÚSTRIA DE PRODUTOS QUÍMICOS S/A, Vargem Grande Paulista—SP (BR)

( * ) Notice: Subject to any disclaimer, the term of this patent is extended or adjusted under 35 U.S.C. 154(b) by 0 days.

(21) Appl. No.: 17/205,939

(22) Filed: Mar. 18, 2021

(65) Prior Publication Data

US 2022/0298330 A1    Sep. 22, 2022

(51) Int. Cl.
    *C08L 7/00*    (2006.01)
(52) U.S. Cl.
    CPC ........... *C08L 7/00* (2013.01); *C08L 2205/035* (2013.01)
(58) Field of Classification Search
    CPC .............................. C08L 7/00; C08L 2205/035
    See application file for complete search history.

(56) References Cited

U.S. PATENT DOCUMENTS

2019/0367712 A1*  12/2019  Bento ................. C08L 23/12
2021/0139681 A1*   5/2021  Delevati ............. C08L 23/0853

FOREIGN PATENT DOCUMENTS

BR    102012025160 A2 *  11/2013  ............. A43B 13/04

OTHER PUBLICATIONS

Machine translation of BR-102012025160-A2 (Year: 2013).*

* cited by examiner

*Primary Examiner* — Wenwen Cai
(74) *Attorney, Agent, or Firm* — B. Aaron Schulman, Esq.; Stites & Harbison, PLLC

(57) ABSTRACT

A plastic modifier, formed from a polymer composition comprising between 10% and 35%, in weight, of natural, non-vulcanized, rubber; between 10% and 70%, in weight, of ethylene vinyl acetate copolymer with a VA content of 19%; between 10% and 70%, in weight, of ethylene vinyl acetate copolymer with a VA content of 28%. The modifier further comprises, in its composition, between 1% to 5%, in weight, of a homogenizer, between 1% and 5%, in weight, of a flow auxiliary, between 1% and 15%, in weight, of a reinforcing load of silicon dioxide and between 1% and 25%, in weight, of up to 15%, in weight, of a mineral load of talc, of up to 15%, in weight, of a mineral load of calcium carbonate, of up to 15%, in weight, of a paraffin plasticizer. This invention also refers to plastic articles comprising the referred modifier and to its use. The modifier of this invention allows energy economy and the use of a sustainable compound, able to promote plastic recycling, in general.

14 Claims, No Drawings

PLASTIC MODIFIER COMPRISING NATURAL RUBBER, PLASTIC ARTICLE AND ITS USE

FIELD OF THE INVENTION

This invention refers to a plastic modifier, in general, formed from a polymer composition comprising natural rubber prepared with olefins and to recycled plastics comprising the referred modifier, able to restore and improve the physical and mechanical properties of virgin and recycled plastics.

BACKGROUND OF THE INVENTION

Several additives and plastic and polymer composition modifiers, in general, are known from the state-of-the-art. The modifiers and additives have a number of functions and are subdivided into categories, according to their functions and characteristics. Thus, the following are additives and modifiers: stabilizers, plasticizers, lubricants, impact modifiers, flame retardants, nucleating agents, among others.

Thus, the additives and modifiers allow that a same polymer can be employed for different purposes and which provide different uses for a final composition comprising modifiers.

In general, the modifiers must present some characteristics to be technical feasible, such as: efficiency for the function it has to perform, stability for processing and for the operational conditions, easy dispersion, without migration to the polymer surface, non-toxicity, low cost and non-impairment of the polymer properties and characteristics.

In general, the additivation occurs due to two main reasons: the need to change the physical and mechanical properties of a material or the need to provide a polymer with increased stability, whether during the processing or during the operation.

Among the modifiers more commonly used in the art are the Nitrile Rubber (NBR) and EPDM (Ethylene Propylene Diene Rubber). With this respect, the nitrile rubber (NBR) shows excellent resistance to oil and abrasion. Its mixture with low unsaturation index rubbers, such as the ethylene-propylene-diene terpolymer (EPDM) or the butyl rubber (IIR), is an attractive way to develop new materials, more resistant to the action of heat, oxygen and ozone. However, the physical properties of such mixtures are generally inferior to those expected from the properties or each of the elastomers, particularly due to the differences in the components' polarity and unsaturation content.

Such modifier options are composed of materials and by exclusively synthetic means, requiring the use of solvents, for example, in their productions and generating, thus, disadvantages from the environmental point-of-view.

SUMMARY OF THE INVENTION

The claimed invention seeks to provide a plastic modifier formed from a polymer composition comprising natural rubber (NR).

The claimed invention also seeks to provide a plastic modifier able to allow the recycling of plastics of different types and origin, when duly added to them, restoring or providing improved physical and mechanical properties.

The claimed invention also seeks to provide a sustainable plastic modifier, comprising natural rubber in its composition.

The claimed invention also seeks to provide a plastic modifier which, when added to any plastic, enables the injection process in conventional thermoplastic injectors or extruded in conventional thermoplastic extruders.

The claimed invention also seeks to provide a plastic modifier which provides the plastic it is added to with high resiliency, flexural strength and stretching resistance, resistance to abrasion, chemical resistance, resistance to low temperature, improved esthetic and rubbery aspects.

The claimed invention seeks to provide a plastic modifier which provides the recycles plastics with properties that are similar to those of the virgin plastic, with capacity of memory and high resiliency.

This claimed invention refers to a plastic modifier comprising natural rubber, which is formed from a polymer composition comprising: between 10% and 35%, in weight, of non-vulcanized natural rubber (NR); between 5% and 35% in weight, of alpha-olefin ethylene copolymer, between 10% and 70%, in weight, of ethylene vinyl acetate copolymer with VA content of 19%; between 10% and 70%, in weight, of ethylene vinyl acetate copolymer with VA content of 28%. The modifier further comprises, in its composition, between 1% to 5%, in weight, of a homogenizer, between 1% and 5%, in weight, of a flow auxiliary, between 1% and 15%, in weight, of a reinforcing load of silicon dioxide, of up to 15%, in weight, of a mineral load of talc, of up to 15%, in weight, of a mineral load of calcium carbonate, of up to 15%, in weight, and between 1% and 25%, in weight, of a paraffin plasticizer.

The modifier preferably comprises one third, in weight, of non-vulcanized natural rubber (NR) with respect to the said modifier composition.

Concerning the homogenizer, HOMOGETEC, a mixture based on synthetic resins is preferably used. The preferred flow auxiliary, in its turn, is FLUXTEC 32, a mixture of fatty acid soap.

The modifier is added to a plastic, preferably selected among polypropylene (PP), polyethylene (PE), ABS, polyethylene terephthalate (PET) and polystyrene (PS), in ratios between 3% and 50%, in volume, of the final plastic composition comprising the modifier.

It also an object that the plastic articles comprising the plastic modifier are in ratios between 3% and 50%, in volume, of the final plastic composition comprising the modifier.

Further, an object of this invention is the use of the plastic modifier being added to a plastic in ratios between 3% and 50%, in volume, of the final plastic composition comprising the modifier.

DETAILED DESCRIPTION OF THE INVENTION

This invention refers to a plastic modifier formed from a polymer composition, able to provide a plastic it is added to significantly increasing the impact resistance, flexibility, stretching and resistance to low temperature, in addition to the capacity of memory and high resiliency.

With this respect, this plastic modifier allows the modification and modification of plastics, in general, being used as additives for virgin plastics or plastics such as polypropylene (PP), polyethylene (PE), ABS, polyethylene terephthalate (PET), polystyrene (PS) and other types of plastics.

Evidently, according to the quantity of modifier use, the plastic will present differentiated properties and characteristics, the modifications of which are intrinsically related to the percentages of modifiers incorporated to any plastic.

Concerning the plastic modifier, which is formed from a polymer composition, especially comprising natural rubber with olefins. The modifier preparation counts on the preparation of the rubber with olefins and, further, by including, to the natural rubber and to the olefins, resin-based compatibilizers and flow auxiliaries, so as to form the composition basis of the plastic modifier according to this invention.

Differently from the plastic modifiers commonly used in the industry, such as Nitrile Rubber (NBR) and EPDM (Ethylene Propylene Diene Rubber), the plastic modifier of this invention, for comprising natural rubber in its composition, is, on an unprecedented way, a renewable and sustainable modifier, presenting green and ecological appeal.

Thus, by decreasing the need to use virgin raw material, the entire polluting chain involved in the production of virgin plastic resins is consequently reduced.

In view of the above considerations, the plastic modifier is formed by a polymer composition comprising between 10% and 35%, in weight, or non-vulcanized natural rubber, between 5% and 35%, in weight, of alpha-olefin ethylene copolymer, between 10% and 70%, in weight, of ethylene vinyl acetate copolymer with VA content of 19%, between 10 and 70%, in weight, of ethylene vinyl acetate copolymer with VA content of 28%, in addition to 1% to 5%, in weight, of a homogenizer, between 1% and 5%, in weight, of flow auxiliaries, between 1% and 15%, in weight, of a reinforcing load of silicon dioxide and between 1% and 25%, in weight, of up to 15%, in weight, of a mineral load of talc, of up to 15%, in weight, of a mineral load of calcium carbonate, of up to 15%, in weight, of paraffin plasticizer.

Although a number of flow auxiliary and homogenizing agents can be used, it is preferred to use component FLUX-TEC 32, a mixture of fatty acid soap, as a flow auxiliary, produced and marketed by Proquitec Indústria, Distribuição e Representação, as well as it is preferred to use component HOMOGETEC MTC as a homogenizing agent, a mixture based on synthetic resins—also produced and marketed by Proquitec.

Concerning the alpha-olefin ethylene copolymer, the referred copolymer is preferably selected from one among TAFMER and ENGAGE (as commercially known).

The non-vulcanized natural rubber, used in the ranges of 10% and 35%, in weight, can be natural rubber of several grades such as, for example, types 3L, GEB, Pale Crepe, SMR, among others. The addition of natural rubber to the composition provides the material with rubbery, elasticity, resiliency, Grip (adherence to the substrate) and abrasion characteristics.

Preferably, the natural rubber corresponds to one third, in weight, among the total components which form the plastic modifier according to this invention.

The plastic modifier composition according to the invention having been described, the physical and mechanical properties of the referred modifier are presented below:
  density: 1.035±0.03 g/cm$^3$ as measured by ASTM D792;
  melt index (190°/2.16 kg): 3.60±0.3 g/10 min as measured by ASTM D1238;
  Mooney viscosity (ML 1+4 at 120° C.): 16.9±5 MU as measured by ASTM D1646;
  tensile strength (100% modulus): 6.88 MPa as measured by ASTM D412;
  tensile strength: 10.88 MPa as measured by ASTM D412;
  elongation: 700% as measured by ASTM D412;
  tear strength: 36.75 kN/m as measured by ASTM D624;
  shore A hardness: 72 pts as measured by ASTM D2240;
  shore D hardness: 20 pts as measured by ASTM D2240; and
  resistance to low temperature: −40° C. as measured by ASTM D1329.

Thus, the plastic modifier according to this invention is added to plastics so as to compose between 3% and 50%, in weight, of the total composition of plastic and modifier, depending on the properties one desires to provide to the plastic and also depending on the type of plastic the modifier is added to.

The addition of high percentages of such plastic modifier (above 50%, in weight), enables the plastic to be recycled more times without losing its properties, such as stretching, for example, in the recycling process.

The addition of the plastic modifier according to this invention to plastics enables the recycling of the same, which have their physical and mechanical properties modified. With this respect, in addition to the already property modifications, the presence of the plastic modifier leads to an energy economy, once the plastics comprising the modifier according to this invention are injected at a lower injection temperature compared to the common plastics, without addition of the referred modifier.

In addition, the addition of the modifier of this invention provides rubbery aspect and better finishing to the plastic articles manufactured from a common plastic composition comprising the said modifier.

Further, the use of the additive enables rigid plastics and those of easy rupture to become extremely flexible and rubbery, once the natural rubber has a long carbon chain, which changes the material characteristics and properties.

There's also a significant improvement in the resistance to low temperature of the plastics when combined with the modifier of this invention, once the presence of natural rubber provides excellent flexibility properties to the plastic under use conditions or up to −40° C.

Among illustrative examples of uses and applications of the plastic modifier according to this invention, the following examples below can be considered.

Example 1

To polypropylene (PP), 50% in weight, the modifier of this invention is added, also at 50%, in weight. From this composition, it is possible, by means of conventional thermoplastic injection methods, to obtain highly rigid and flexible plastic articles, replacing in many applications (uses for works up to 130° C.) Polyamide (PA) 66 Nylon 66. In addition to the cost decrease, this composition allows a significant reduction in the injection temperature, once Polyamide 66 is injected at temperatures higher than 260° C. and required hydration in order to increase its flexibility. The Polypropylene 50%/modifier 50% combination allows to eliminate the hydration process and reduction of the injection temperature to 190° C.

From the injection of this final composition, the following can be obtained: bushings, connections, seals, engineering plastics, connectors, circuit breakers.

Example 2

The modifier of this invention is added to polypropylene up to 30% in volume. The composition, by means of common thermoplastic injection processes, may form plastic articles, such as: chairs, bumpers, boxes, crates, packages, lids, tables, pallets, frames, flooring, engineering plastics, connections, tubs, plastics, in general.

Example 3

The modifier up to 5% in volume added to polypropylene showed, in tests conducted according to the common standards described in this report an increased stretching from 50% to 100%.

By increasing the quantity of modifier from 5% to 10%, in volume, a stretching variation from 50% to 125% was determined, also presenting decreased hardness in modifier ranges of more than 5%.

Example 4

The modifier up to 30% in volume added to polyethylene plastics may give origin to: pallets, toilet seats, helmets, packages, lids, protectors, toys, industrial boxes, plastics, in general.

Example 5

The modifier up to 30% in volume added to polystyrene (PS) plastics may give origin to: coatings, combs, hangers, circuit breakers, trays, plastics in general.

Example 6

The modifier up to 30% in volume added to ABS plastics may give origin to: furniture, home appliances, grids, panels, helmets, electronic products, motorcycle fairing and plastics in general.

Example 7

To PLA (Polylactic Acid Plastic) is added 10% the plastic modifier. PLA is very rigid and breaks easily. Thus, modifying the PLA with the addition of 10% of plastic modifier leaves the PLA flexible, greatly increasing the possibilities of using the PLA.

Having described examples of achievements preferred of this invention, it must be understood that the scope of this invention covers other possible variations of the described inventive concept, being limited just by the content of the claims, including the possible equivalents.

The invention claimed is:

1. A plastic modifier comprising:
   (a) between 25% and 35%, in weight, of a non-vulcanized natural rubber;
   (b) between 5% and 25%, in weight, of an alpha-olefin ethylene copolymer
   (c) between 10% and 30%, in weight, of ethylene vinyl acetate copolymer with a vinyl acetate (VA) content of 19%;
   (d) between 10% and 30%, in weight, of ethylene vinyl acetate copolymer with a vinyl acetate (VA) content of 28%;
   (e) between 1% and 15%, in weight, of silicon dioxide; and
   (f) between 1% and 15%, in weight, of talc;
   wherein the plastic modifier reduces the injection molding temperature of a plastic comprising the plastic modifier compared to the same plastic without the plastic modifier, resulting in energy savings; and
   wherein the plastic modifier enables the use of conventional thermoplastic injectors or extruders for processing the plastic containing the plastic modifier.

2. The plastic modifier according to claim 1, comprising one third, in weight, of the non-vulcanized natural rubber.

3. The plastic modifier according to claim 1, further comprising between 1% and 5%, in weight, of a flow auxiliary.

4. The plastic modifier according to claim 1, further comprising between 1% and 15%, in weight, of calcium carbonate.

5. The plastic modifier according to claim 1, further comprising between 1% and 25%, in weight, of a paraffin plasticizer.

6. The plastic modifier according to claim 3, wherein the flow auxiliary is a mixture of fatty acid soap.

7. The plastic modifier, according to claim 1, wherein the plastic modifier has properties as follows:
   density: $1.035 \pm 0.03$ g/cm$^3$ as measured by ASTM D792;
   melt index (190°/2.16 kg): $3.60 \pm 0.3$ g/10 min as measured by ASTM D1238;
   Mooney viscosity (ML 1+4 at 120° C.): $16.9 \pm 5$ MU as measured by ASTM D1646;
   tensile strength (100% modulus): 6.88 MPa as measured by ASTM D412;
   tensile strength: 10.88 MPa as measured by ASTM D412;
   elongation: 700% as measured by ASTM D412;
   tear strength: 36.75 kN/m as measured by ASTM D624;
   shore A hardness: 72 pts as measured by ASTM D2240;
   shore D hardness: 20 pts as measured by ASTM D2240; and
   resistance to low temperature: $-40°$ C. as measured by ASTM D1329.

8. A plastic modifier comprising:
   (a) between 25% and 35%, in weight, of a non-vulcanized natural rubber;
   (b) between 5% and 25%, in weight, of an alpha-olefin ethylene copolymer
   (c) between 10% and 30%, in weight, of ethylene vinyl acetate copolymer with a vinyl acetate (VA) content of 19%;
   (d) between 10% and 30%, in weight, of ethylene vinyl acetate copolymer with a vinyl acetate (VA) content of 28%;
   (e) between 1% and 15%, in weight, of silicon dioxide; and
   (f) between 1% and 15%, in weight, of calcium carbonate;
   wherein the plastic modifier reduces the injection molding temperature of a plastic comprising the plastic modifier compared to the same plastic without the plastic modifier, resulting in energy savings; and
   wherein the plastic modifier enables the use of conventional thermoplastic injectors or extruders for processing the plastic containing the plastic modifier.

9. A plastic modifier comprising:
   (a) between 25% and 35%, in weight, of a non-vulcanized natural rubber;
   (b) between 5% and 25%, in weight, of an alpha-olefin ethylene copolymer
   (c) between 10% and 30%, in weight, of ethylene vinyl acetate copolymer with a vinyl acetate (VA) content of 19%;
   (d) between 10% and 30%, in weight, of ethylene vinyl acetate copolymer with a vinyl acetate (VA) content of 28%;
   (e) between 1% and 15%, in weight, of talc; and
   (f) between 1% and 15%, in weight, of calcium carbonate;
   wherein the plastic modifier reduces the injection molding temperature of a plastic comprising the plastic modifier compared to the same plastic without the plastic modifier, resulting in energy savings; and
   wherein the plastic modifier enables the use of conventional thermoplastic injectors or extruders for processing the plastic containing the plastic modifier.

10. A method of using the plastic modifier according to claim 1, said method comprising adding the plastic modifier to a plastic composition in an amount so that the amount of the plastic modifier is between 3% and 50%, in weight, of the plastic composition after the plastic modifier is added.

11. A plastic article comprising plastic and the plastic modifier of claim 1 wherein the plastic article comprises between 3% and 50%, in weight, of the plastic modifier.

12. The plastic article according to claim 11, wherein the plastic is selected from a group consisting of: polypropylene (PP), polyethylene (PE), ABS, polyethylene terephthalate (PET), polystyrene (PS), Polyamide 66 and Polylactic Acid Plastic (PLA).

13. A composition comprising plastic and the plastic modifier of claim 1, wherein the composition comprises between 3% and 50%, in weight, of the plastic modifier.

14. The composition according to claim 13, wherein the plastic is selected from the group consisting of polypropylene (PP), polyethylene (PE), ABS, polyethylene terephthalate (PET), polystyrene (PS), Polyamide 66, and Polylactic Acid Plastic (PLA).

\* \* \* \* \*